No. 738,997. PATENTED SEPT. 15, 1903.
E. HAYNES, R. WILEY & H. MURDEN.
STEERING MECHANISM FOR MOTOR DRIVEN VEHICLES.
APPLICATION FILED DEC. 29, 1902.
NO MODEL. 2 SHEETS—SHEET 1.
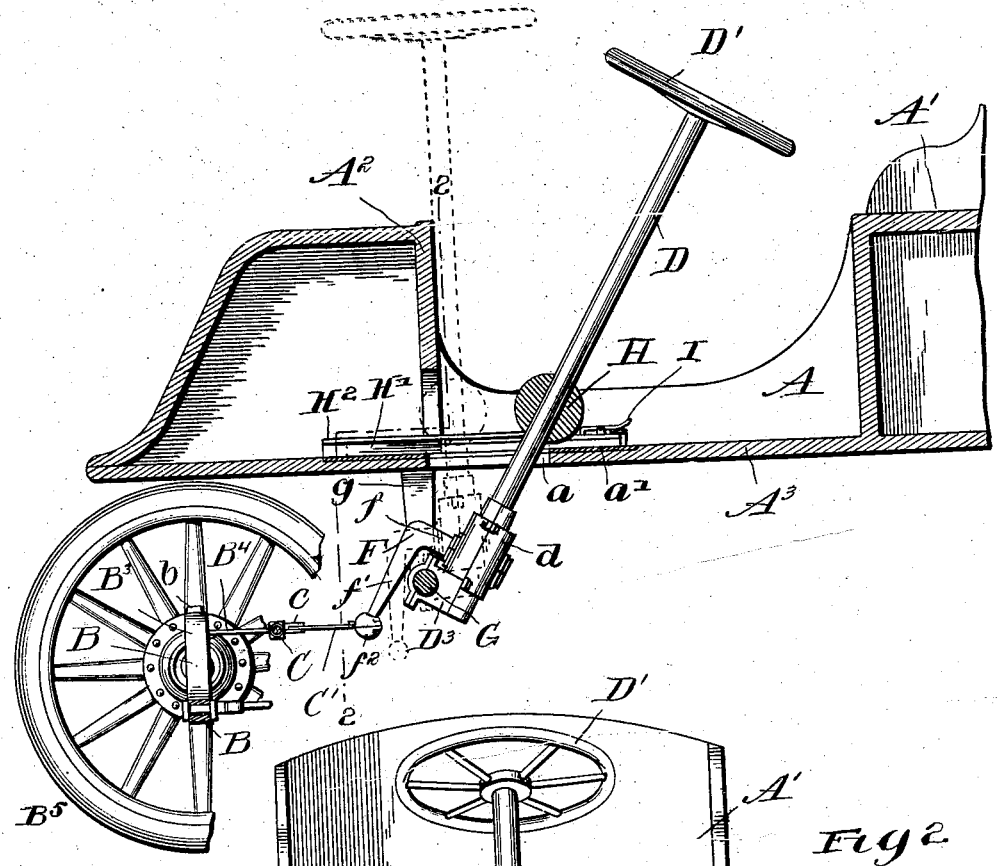
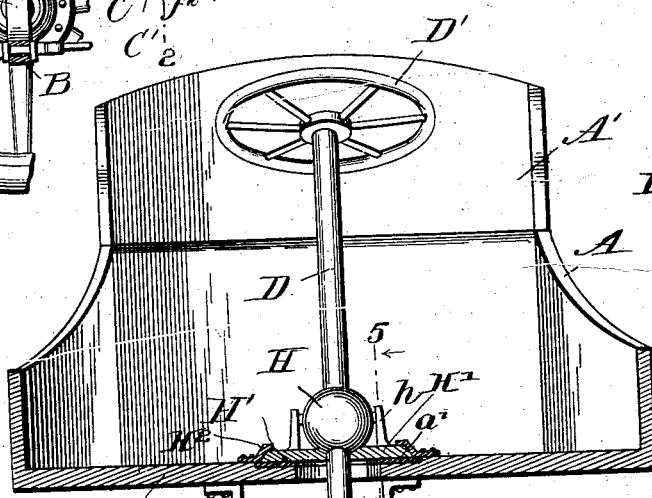
Witnesses:
F. C. Barry
Carl A. Crawford
Inventors
Elwood Haynes
Richard Wiley
Herbert Murden
by Poole & Brown
Attorneys.
THE NORRIS PETERS CO., PHOTO-LITHO., WASHINGTON, D. C.

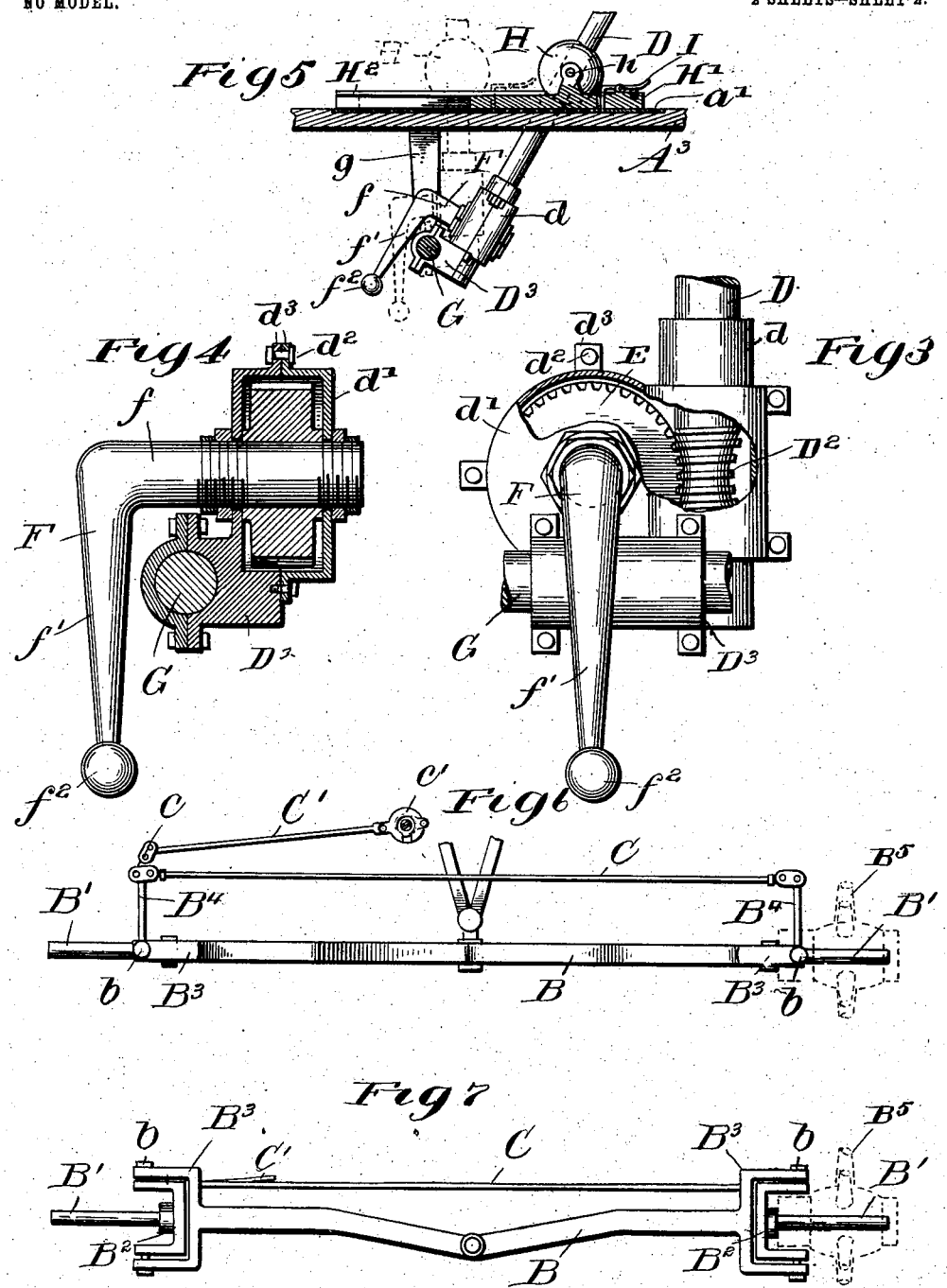

No. 738,997. Patented September 15, 1903.

UNITED STATES PATENT OFFICE.

ELWOOD HAYNES, RICHARD WILEY, AND HERBERT MURDEN, OF KOKOMO, INDIANA, ASSIGNORS TO THE HAYNES-APPERSON COMPANY, OF KOKOMO, INDIANA, A CORPORATION OF INDIANA.

STEERING MECHANISM FOR MOTOR-DRIVEN VEHICLES.

SPECIFICATION forming part of Letters Patent No. 738,997, dated September 15, 1903.

Application filed December 29, 1902. Serial No. 136,928. (No model.)

*To all whom it may concern:*

Be it known that we, ELWOOD HAYNES, RICHARD WILEY, and HERBERT MURDEN, of Kokomo, in the county of Howard and State of Indiana, have invented certain new and useful Improvements in Steering Mechanism for Motor-Driven Vehicles; and we do hereby declare that the following is a full, clear, and exact description thereof, reference being had to the accompanying drawings, and to the letters of reference marked thereon, which form a part of this specification.

This invention relates to improvements in steering mechanism for motor-driven vehicles; and the invention consists in the matters hereinafter set forth, and more particularly pointed out in the appended claims.

The steering mechanism herein shown is designed more especially for machines of high power, and therefore machines made of considerable weight, though it may be employed on the lighter class of vehicles.

In the drawings, Figure 1 is a vertical section of the front part of a motor-vehicle provided with our invention. Fig. 2 is a transverse vertical section thereof, taken on line 2 2 of Fig. 1. Fig. 3 is a detail front elevation of the part of the steering device located below the floor of the vehicle-body with parts broken away. Fig. 4 is a section taken on line 4 4 of Fig. 3. Fig. 5 is a detail section taken on line 5 5 of Fig. 2. Figs. 6 and 7 are plan view and side elevations, respectively, of the front or steering axle and the associated parts of the steering mechanism.

As shown in said drawings, A designates the body of the vehicle, A' the seat, and $A^2$ the dash, said body being shown as provided with a front known as the "French" front, common in vehicles of high horse-power.

B designates the front or steering axle of the vehicle, to which the reach is connected centrally of the axle. Said axle is provided on its ends with hinged or pivotal axle stubs or spindles B', upon which the front wheels $B^5$ are mounted. Said spindles are formed on or carried by yokes $B^2$, which latter are contained within and pivoted by means of pivot-pins $b$ to yokes $B^3$, formed on the opposite ends of the central part of the axle. Extending rearwardly from the yokes $B^2$ of the axle stubs or spindles and connected rigidly therewith are arms $B^4$, and loosely connected with the rear ends of said arms is a connecting-rod C, which constitutes part of the steering-gear.

C' designates an actuating rod or bar which is loosely connected at one end with a fitting $c$, which is loosely connected with one of the arms $B^4$, and the opposite end of said arm is provided with a fitting $c'$, which is adapted for connection with the part of the steering mechanism immediately actuated by the steering-shaft.

The foregoing construction constitutes no part of the present invention in itself and may be made of any desired type.

Referring now to the novel features of construction of our novel steering device, said parts are made as follows:

D designates a steering-shaft which is located in front of the seat A' and extends downwardly through a slot $a$ in the floor or bottom $A^3$ of the vehicle-body and is provided at its upper end with a hand-wheel D', by which the shaft is rotated. Said shaft is normally inclined rearwardly toward the seat A', so as to be in convenient reach of the chauffeur for steering the vehicle. The shaft is provided at its lower end beneath the bottom of the body with a worm $D^2$, which meshes with a worm-wheel E, located at one side of the worm. Said worm is inclosed in a suitably-shaped casing $d$, which is cut away at one side to permit meshing of the worm with the wheel, and the wheel is inclosed in a casing $d'$, which is preferably made integral with the worm-casing. Conveniently the casings for the worm-wheel and worm are made of two similar parts, which may be laterally separated to assemble the same in the device or remove the same therefrom, and said parts of the casing are joined by means of bolts $d^2$, extending through apertured lugs $d^3$ on the parts of the casing.

F designates an angular arm, one member $f$ of which extends centrally through the worm-wheel E and is keyed or otherwise fixed rigidly thereto and has bearing on each side of the wheel in the side members or parts of the wheel-inclosing casing, and the other member $f'$ of said arm extends obliquely forwardly and downwardly and is provided at its lower end with a rounded extremity or ball $f^2$, which is adapted to engage a suitably-shaped socket in the fittings $c'$ of the actuating bar or rod $C'$ of the steering-gear hereinabove mentioned. By reason of the non-rotative attachment of said arm F to the wheel E and the bearing of said arm in the casing of said wheel rotation of the shaft D imparts through the worm-wheel a rotative movement to the upper member $f$ of said arm and a swinging movement to the lower member $f'$ thereof. Such swinging movement of the arm $f'$ is transmitted through the actuating bar or rod $C'$ to the pivoted stub-axles hereinbefore mentioned, whereby the front or steering wheels of the vehicle are properly turned or inclined to steer the vehicle.

The shaft B is so connected with the vehicle-body as to be swung forwardly away from the seat in order to permit convenient ingress to and egress from the vehicle, and the parts are so connected with or supported on the body as to permit such swinging thereof without effecting a disarrangement of the several parts of the mechanism. The construction whereby said shaft is permitted to be swung forwardly in the manner described is made as follows: The worm-casing D is provided with an integral lug $D^3$, which extends forwardly therefrom, and said lug is provided with a bearing-aperture whereby the lug may be pivoted to a horizontal bar G, extending transversely beneath the bottom of the vehicle-body. Said bar G may be attached to the body of the vehicle in any suitable manner. As herein shown, the rod is made short and is attached at its ends to attaching-arms $g$, which are suitably secured to the lower side of the vehicle-body bottom. Said shaft G constitutes, therefore, a fulcrum about which the shaft D is turned to swing the same forwardly. The slot $a$ in the vehicle-body is made of sufficient length to permit such swinging of the shaft. The shaft D has sliding engagement with a sleeve H, which is located above the bottom of the vehicle-body and is pivotally connected with lugs $h$ on a horizontally-sliding plate $H'$, which is located over and closes the opening $a$ in the bottom of the vehicle-body. Said plate $H'$ has sliding engagement with a plate $a'$, which is seated in the vehicle-body bottom and slotted in alinement with the slot to permit the passage of the shaft D therethrough. The forward end of the slide $H'$ extends beneath and is adapted to slide under the dash $A^2$ when the shaft is thrown forwardly. The plate $H'$ is provided with an opening through which the shaft D extends, said opening being made but little larger than the shaft. The plate $H'$ therefore slides with the shaft when the latter is thrown backwardly and forwardly and is made of sufficient length to cover the opening $a$ in all positions of the shaft D.

The sleeve H is shown as made of spherical form and fits the opening in the plate $H'$, through which the shaft D extends to properly close said opening and to produce a neat finish at this place. Said slide is held down on said plate $a'$ by means of angle guide-bars $H^2$, which are bolted to the plate $a'$ and overlap the side margins of said slide in the manner clearly shown in Fig. 2.

The shaft D is adapted to be locked at any suitable angle by means of a spring-latch I, which is pivoted to the plate $H'$ and is adapted to extend at its ends through an opening in said plate $H'$ and to enter one of a series of openings in the upper face of the plate $a'$, as shown in Fig. 5. The latch may be thrown upwardly by the foot of the person operating the vehicle, and when released from the plate $a'$ the shaft may be swung forwardly or rearwardly so long as the latch is held out of operative engagement, and when the shaft has reached the approximate inclination desired the latch is released and is automatically engaged with one of the openings in the plate $a'$ to lock the parts in place.

The pivotal axis of the shaft D may be located at any place most convenient or desirable for the designer. It is desirable, however, that it be located closely adjacent to the ball-and-socket joint between the arm F and the rod or bar $C'$, for the reason that the closer these parts are placed the less will be the backward and forward swinging of said arm when the shaft D is swung forwardly. In case such a movement should effect a shifting of the steering-wheels when the shaft is swung upwardly such shifting may be corrected by slightly turning or rotating the steering-shaft one direction or the other, as the case may require.

It will be observed that the shaft D when in its forward position is swung against the dash $A^2$, so that the entire space between the dash and seat is available to afford easy and comfortable ingress to and egress from the vehicle.

The construction described is an advantageous one, for the reason that it enables the steering-shaft to be shifted forwardly away from the seat without the necessity of providing the shaft with a hinge-joint, as heretofore common.

It is obvious that many changes may be made in the structural details shown without departing from the spirit of our invention, and we do not wish to be limited to such details except as hereinafter made the subject of specific claims.

We claim as our invention—

1. In a steering mechanism for motor-driven vehicles, the combination with the steering-wheels, and the vehicle-body provided in its floor with a slot, of a rotative shaft which extends downwardly through said slot below said floor, a worm-gear mechanism below the floor operatively connecting said shaft with the steering-wheels, a frame located beneath said floor in which said shaft has rotative bearing and which supports said worm-gear mechanism, said frame being pivoted to a part below said floor, whereby the upper end of the shaft may swing toward and from the vehicle-seat, said worm-gear mechanism partaking of the swinging movement of the shaft.

2. In a steering mechanism for motor-driven vehicles, the combination with the steering-wheels and the vehicle-body provided in its floor with a slot, of a rotative steering-shaft extending through said slot, a worm-wheel meshing with the worm and operatively connected with the steering-wheels, and a frame located wholly beneath the said body-floor in which said shaft has rotative bearing and which supports said worm and worm-wheel, said frame being pivoted to a part below said vehicle-body, whereby said shaft is adapted to swing at its upper end toward and away from the vehicle-seat, said frame partaking of the swinging movement of the shaft.

3. In a steering mechanism for motor-driven vehicles, the combination with the steering-wheels and the vehicle-body provided in its floor with a slot, of a rotative steering-shaft extending downwardly through said slot and pivoted to a part below said floor so as to swing at its upper end toward and away from the vehicle-seat, operative connections between the lower end of the shaft and the steering-wheels and means for keeping closed the slot in said floor in all positions of the shaft on its pivot.

4. In a steering mechanism for motor-driven vehicles, the combination with the steering-wheels, and the vehicle-body provided in its floor with a slot, of a rotative steering-shaft extending downwardly through said slot, operative connections between the lower end of the shaft and the steering-wheels, means for pivoting said shaft below the bottom body to swing toward and away from the vehicle-seat and a sleeve having sliding connection with the body-bottom through which said shaft slides endwise.

5. In a steering mechanism for motor-driven vehicles, the combination with the steering-wheels and the vehicle-body provided in its floor with a slot, of a steering-shaft extending downwardly through said slot, a worm on the lower end of the shaft, a worm-wheel meshing with the worm and operatively connected with said steering-wheels, a frame or casing inclosing the worm and wheel and pivoted to the vehicle below said body, and an apertured plate sliding over and closing said slot.

6. In a steering mechanism for motor-driven vehicles, the combination with steering-wheels and the vehicle-body provided in its floor with a slot, of a steering-shaft extending downwardly through said slot, a worm on the lower end of the shaft, a worm-wheel meshing with the worm and operatively connected with said steering-wheels, a frame or casing inclosing the worm and wheel and pivoted to the vehicle below said body, an apertured plate sliding over and closing said slot, and a sleeve above said plate through which said shaft slides, said sleeve being pivoted to said sliding plate.

7. In a steering mechanism for motor-driven vehicles, the combination with steering-wheels and the vehicle-body provided in its floor with a slot, of a steering-shaft extending downwardly through said slot, a worm on the lower end of the shaft, a worm-wheel meshing with the worm and operatively connected with said steering-wheels, a frame or casing inclosing the worm and wheel and pivoted to the vehicle below said body, an apertured plate sliding over and closing said slot, a sleeve above said plate through which said shaft slides, said sleeve being pivoted to said sliding plate, and a latch for temporarily locking said plate to the body-floor.

8. In a steering mechanism for motor-driven vehicles, the combination with the steering-wheels and the vehicle-body provided in its floor with a slot, of a steering-shaft extending downwardly through said slot, operative connections between the shaft and said steering-wheels, means for pivoting the shaft to the vehicle below the body-floor to swing toward and away from the seat, an apertured sliding plate through which said shaft extends and which covers said slot, and a sleeve pivoted to said plate through which the shaft slides.

9. In a steering mechanism for motor-driven vehicles, the combination with the steering-wheels and the vehicle-body provided in its floor with a slot, of a rotative steering-shaft extending downwardly through said slot, a worm on the lower end of the shaft, a worm-wheel meshing with said worm, a shaft non-rotatively affixed to said worm-wheel, and provided with an arm which is operatively connected with the steering devices of the steering-wheels, and a frame located wholly below the body-floor and supporting the worm-wheel and shaft and pivoted to the vehicle whereby the shaft may swing toward and from the vehicle-seat while maintaining the intermeshing relation between the worm and worm-wheel.

In testimony that we claim the foregoing as our invention we affix our signatures, in presence of two witnesses, this 23d day of December, A. D. 1902.

ELWOOD HAYNES.
RICHARD WILEY.
HERBERT MURDEN.

Witnesses:
C. H. HAYNES,
L. W. SMELSER.